(12) United States Patent
Fujita et al.

(10) Patent No.: US 7,246,161 B2
(45) Date of Patent: Jul. 17, 2007

(54) MANAGING METHOD FOR OPTIMIZING CAPACITY OF STORAGE

(75) Inventors: Takahiro Fujita, Yokohama (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 10/657,162

(22) Filed: Sep. 9, 2003

(65) Prior Publication Data

US 2005/0015475 A1  Jan. 20, 2005

(30) Foreign Application Priority Data

Jul. 17, 2003  (JP) ............................. 2003-198183

(51) Int. Cl.
*G06F 15/173* (2006.01)
(52) U.S. Cl. .................................................... 709/223
(58) Field of Classification Search ................ 709/203, 709/223–226, 213–216; 711/170–173
See application file for complete search history.

(56) References Cited

U.S. PATENT DOCUMENTS

| | | | |
|---|---|---|---|
| 6,026,425 A | 2/2000 | Suguri et al. | |
| 6,098,074 A * | 8/2000 | Cannon et al. | 707/200 |
| 6,230,247 B1 * | 5/2001 | Cannon et al. | 711/171 |
| 6,516,350 B1 * | 2/2003 | Lumelsky et al. | 709/226 |
| 6,745,207 B2 * | 6/2004 | Reuter et al. | 707/200 |
| 6,771,611 B1 * | 8/2004 | Garg | 370/272 |
| 6,799,206 B1 * | 9/2004 | Workman et al. | 709/223 |
| 6,799,208 B1 * | 9/2004 | Sankaranarayan et al. | 709/223 |
| 6,799,260 B1 * | 9/2004 | Tunali et al. | 711/170 |
| 6,832,248 B1 * | 12/2004 | Byrnes | 709/223 |
| 6,877,035 B2 * | 4/2005 | Shahabuddin et al. | 709/226 |
| 6,898,634 B2 * | 5/2005 | Collins et al. | 709/226 |
| 6,901,446 B2 * | 5/2005 | Chellis et al. | 709/226 |
| 2002/0099914 A1 * | 7/2002 | Matsunami et al. | 711/154 |
| 2003/0023660 A1 | 1/2003 | Kosanovic | |
| 2003/0061331 A1 * | 3/2003 | Nakamura et al. | 709/223 |
| 2003/0061491 A1 * | 3/2003 | Jaskiewicz et al. | 713/182 |
| 2003/0110263 A1 * | 6/2003 | Shillo | 709/226 |
| 2003/0145086 A1 * | 7/2003 | O'Reilly | 709/226 |
| 2004/0025162 A1 | 2/2004 | Fisk | |
| 2004/0054850 A1 | 3/2004 | Fisk | |
| 2004/0158573 A1 * | 8/2004 | Bradley et al. | 707/102 |
| 2004/0243692 A1 * | 12/2004 | Arnold et al. | 709/220 cited by examiner |

FOREIGN PATENT DOCUMENTS

JP  2002-222061  8/2002

OTHER PUBLICATIONS

BMC Software; Storage Resource Management for the Enterprise Server; 2001.*

*

*Primary Examiner*—William Vaughn
*Assistant Examiner*—Sean Reilly
(74) *Attorney, Agent, or Firm*—Mattingly, Stanger, Malur & Brundidge, P.C.

(57) ABSTRACT

In an environment in which storages are intensively collected, many unused areas are generated and no storage resources can be efficiently used as a storage pool. The capacity utilization (data capacity) of a storage device (volume) allocated to a computer is obtained and future capacity utilization is estimated from a change in the data capacity. The capacity of the storage device is compared with upper limit securing capacity and lower limit securing capacity values indicating the upper and lower limits of appropriate allocating capacity calculated from this estimated capacity utilization. When the capacity of the storage device is greater than the upper limit securing capacity, a different storage device, having at least the lower limit securing capacity and no more than the upper limit securing capacity, is allocated from the storage pool, and the storage device allocated previously is collected in the storage pool.

7 Claims, 8 Drawing Sheets

| DATA IDENTI-FIER | APPLICA-TION KIND | COMPUTER | DEVICE IDENTIFIER | CAPACITY | LOWER LIMIT SECURING RATIO | UPPER LIMIT SECURING RATIO | CAPACITY COLLECTION YES/NO | ALLOCATION STATE |
|---|---|---|---|---|---|---|---|---|
| ID1 | GENERAL | COMPUTER 1 | H R400 1111 0101 | 20GB | 110 | 120 | YES | PROPER |
| ID2 | DATABASE | COMPUTER 2 | H R400 1111 0102 | 80GB | 120 | 130 | YES | EXCESSIVELY SMALL |
| ID3 | FILE SERVER | COMPUTER 3 | H R400 1111 0105 | 40GB | 120 | 130 | YES | EXCESSIVELY LARGE |
| ID4 | DATABASE | COMPUTER 1 | H R400 2222 0104 | 40GB | 105 | 115 | NO | PROPER |

900

⋮

| DEVICE IDENTIFIER | STORAGE PORT IDENTIFIER | CHANNEL ADAPTER IDENTIFIER | COMPUTER PORT IDENTIFIER |
|---|---|---|---|
| H R400 1111 0101 | WWN1 | 1 | WWNA |
| H R400 1111 0102 | WWN2 | 1 | WWNB |
| H R400 1111 0103 | WWN1 | 1 | WWNA |
| H R400 1111 0104 | IPAddress3 | 2 | IPAddressD |

| DATA IDENTI-FIER | APPLICA-TION KIND | COMPUTER | DEVICE IDENTIFIER | CAPACITY | LOWER LIMIT SECURING RATIO | UPPER LIMIT SECURING RATIO | CAPACITY COLLECTION YES/NO | ALLOCATION STATE |
|---|---|---|---|---|---|---|---|---|
| ID1 | GENERAL | COMPUTER 1 | H R400 1111 0101 | 20GB | 110 | 120 | YES | PROPER |
| ID2 | DATABASE | COMPUTER 2 | H R400 1111 0102 | 80GB | 120 | 130 | YES | EXCESSIVELY SMALL |
| ID3 | FILE SERVER | COMPUTER 3 | H R400 1111 0105 | 40GB | 120 | 130 | YES | EXCESSIVELY LARGE |
| ID4 | DATABASE | COMPUTER 1 | H R400 2222 0104 | 40GB | 105 | 115 | NO | PROPER |

| APPLICATION KIND | ADDITION SECURING RATIO | ADDITION SECURING WIDTH |
|---|---|---|
| GENERAL | +5 | +5 |
| DATABASE | +10 | +5 |
| FILE SERVER | +20 | +10 |
| ARCHIVE | +0 | +2 |

| ACCESS CHARACTER-ISTICS | ADDITION SECURING RATIO | ADDITION SECURING WIDTH |
|---|---|---|
| ONLY READ | +0 | +2 |
| READ-WRITE | +5 | +5 |
| WRITE ONCE | +10 | +2 |
| CHANGE | +5 | +10 |

| IMPORTANT DEGREE | ADDITION SECURING RATIO | ADDITION SECURING WIDTH |
|---|---|---|
| 1 | +0 | +2 |
| 2 | +10 | +5 |
| 3 | +20 | +10 |

| DATA IDENTIFIER | OBTAINED TIME | USED CAPACITY | OBTAINED PERIOD | MAXIMUM USED CAPACITY | MINIMUM USED CAPACITY | THE NUMBER OF READ TIMES | THE NUMBER OF WRITE TIMES |
|---|---|---|---|---|---|---|---|
| ID1 | 2002/10/19 23:00 | 15GB | 3weeks | 15GB | 13GB | 10000 | 500 |
| ID1 | 2002/11/09 23:00 | 16GB | 3weeks | 16GB | 14GB | 10000 | 300 |
| ID1 | 2002/11/30 23:00 | 16GB | 3weeks | 16GB | 15GB | 10000 | 400 |
| ID1 | 2002/12/21 23:00 | 16GB | 3weeks | 16GB | 14GB | 10000 | 300 |

| DEVICE IDENTIFIER | CAPACITY | COST | USED COMPUTER |
|---|---|---|---|
| H R400 1111 0101 | 20GB | HIGH | COMPUTER 1 |
| H R400 1111 0102 | 80GB | HIGH | COMPUTER 2 |
| H R400 1111 0103 | 40GB | HIGH | NON-EXISTENCE |
| H R400 1111 0104 | 40GB | MIDDLE | NON-EXISTENCE |
| H R400 1111 0105 | 40GB | HIGH | COMPUTER 3 |
| H R400 1111 0106 | 80GB | LOW | NON-EXISTENCE |
| H R400 1111 0107 | 40GB | LOW | NON-EXISTENCE |
| H R400 2222 0102 | 80GB | MIDDLE | NON-EXISTENCE |
| H R400 2222 0104 | 40GB | MIDDLE | COMPUTER 1 |

800

MANAGING METHOD FOR OPTIMIZING CAPACITY OF STORAGE

BACKGROUND OF THE INVENTION

The present invention relates to a method for centrally managing plural storage devices.

In recent years, a technique for connecting a computer and plural storage devices by way of a network (storage area network (SAN)) and centrally managing the plural storage devices connected to the SAN has been proposed.

As a method for managing plural storage devices connected to a SAN, there is a technique for centrally managing a storage device (volume), among the plural storage devices connected to the SAN, as a storage pool, and efficiently using the memory capacity of the storage device connected to the SAN.

In a conventional system, capacity is added, by on-demand from a storage pool, when the volume capacity become short due to insufficient estimation of the capacity being used, at an insufficient time point. (For example, see (Patent Literature 1) JP-A-2002-222061 at p. 9, FIG. 11).

It is difficult to accurately estimate the capacity utilization in advance and to allocate the needed volume. In the past, when the capacity utilization (data capacity) was not increased as estimated, an unused storage area would remain and never be used.

In an environment in which storage devices are intensively consolidated and many volumes exist, it will happen that many unused and useless storage areas remain unused. Since such unused storage areas in volumes are unused, but cannot be utilized as the storage pool, the storage resources can not be efficiently used.

SUMMARY OF THE INVENTION

An object of the present invention is to provide a managing method and a managing program to achieve high utilization of resources by collecting an excessively allocated storage area in a storage pool so as to utilize this storage area in another computer.

In one embodiment of the present invention, the capacity utilization (data capacity) of a storage device (volume) allocated to a computer is periodically obtained, and future capacity utilization is estimated from a trend in the utilization of the data capacity.

Further, the capacity of a storage device is compared with an upper limit securing capacity and a lower limit securing capacity, representing the upper and lower limits of an appropriate allocating capacity, which are calculated from the estimated capacity utilization. When the capacity of the storage device (old device) is greater than the upper limit securing capacity, a storage device (new device) having a lower limit securing capacity or more and an upper limit securing capacity or less is allocated from the storage pool, and the old device is collected in the storage pool.

Further, in another embodiment of the present invention, maximum capacity utilization, minimum capacity utilization, the number of I/O read operations and the number of I/O write operations are periodically obtained in addition to the capacity utilization of the volume allocated to the computer. When the data capacity is constant and the number of I/O write operations to a volume (old volume) is 0 for a certain period, data in the volume is marked as "archive" and is moved to a storage device of low cost so that the capacity of the old device is collected.

The other features of the present invention will become apparent from the descriptions provided in this specification and from the accompanying drawings.

BRIEF DESCRIPTION OF THE DRAWINGS

FIGS. 4(A) to 4(D) are diagrams which show a data management table, addition securing capacity and an addition securing width management table of this embodiment.

FIG. 5 is a diagram showing the contents of a capacity utilization management table of this embodiment.

FIG. 6 is a diagram showing the contents of a device management table of this embodiment.

DESCRIPTION OF THE PREFERRED EMBODIMENT

Figure 1:
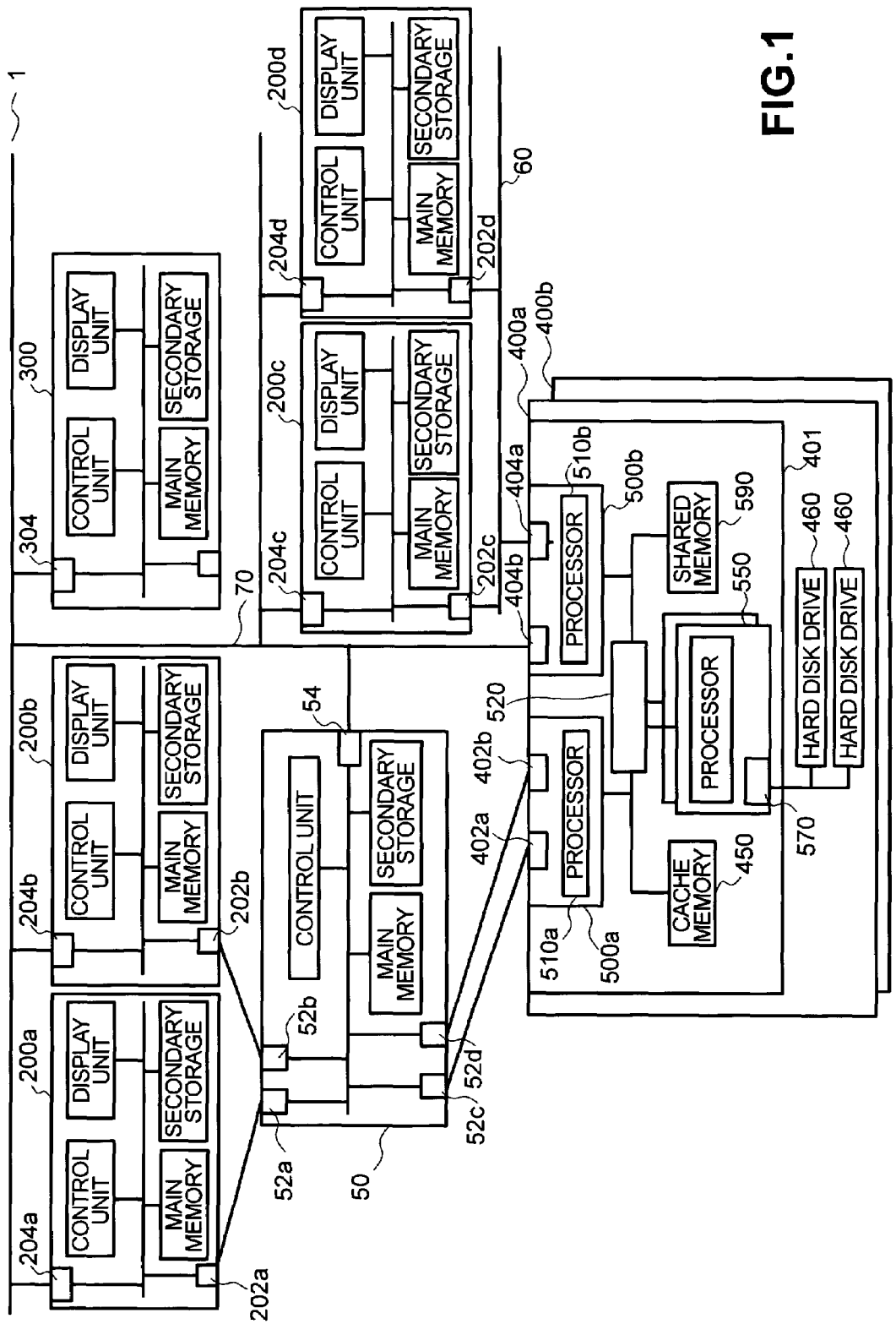
FIG. 1 is a block diagram of a computer system representing an embodiment of the present invention.

FIG. 1 is a block diagram showing an embodiment of a computer system according to the present invention. The computer system 1 includes computers 200*a*, 200*b*, 200*c*, 200*d* (generally referred to as "computer 200"), a management computer 300, a fibre optic channel switch 50, Internet Protocol (hereinafter called "IP") networks 60 and 70, and a storage apparatus 400 (400*a*, 400*b*).

The storage apparatus 400 is connected to computers 200*a* and 200*b* through the fibre optic channel switch 50. The storage apparatus 400 is also connected to computers 200*c* and 200*d* through the IP network 60. The storage apparatus 400 is further connected to the management computer 300 by the IP network 70.

The computers 200*a* and 200*b*, which are connected to the storage apparatus 400 through the fibre optic channel switch 50, transfer data by using SCSI Protocol over Fibre Channel (hereinafter called "FCP") protocol. The computers 200*c* and 200*d*, which are connected to the storage apparatus 400 through the IP network 60, transfer data by using iSCSI protocol, which is able to transfer SCSI commands through the IP protocol.

The fibre channel switch 50 has a control unit, main memory, secondary storage and interfaces 52*a*, 52*b*, 52*c*, 52*d* to the control unit to connect the computer 200 and the storage apparatus 400, and an interface 54 for connection with the IP network 70.

The storage apparatus 400 has a control unit 401 and at least one hard disk drive 460. The control unit 401 has channel adapters 500*a*, 500*b* (generally referred to as "channel adapter 500"), a cache memory 450, a shared memory 590, a disk adapter 550 and a crossbar switch 520. The channel adapter 500, the cache memory 450, the shared memory 590 and the disk adapter 550 are connected to each other by the crossbar switch 520. A bus also may be also used instead of the crossbar switch 520.

Each hard disk drive 460 is connected to the disk adapter 550 through a port 570. The storage apparatus 400 may also have plural disk adapters 550. In this case, the plural disk adapters 550 are connected to respective crossbar switches 520. The plural hard disk drives 460 are connected to respective disk adapters 550.

An identifier number is assigned to the channel adapter 500, and the channel adapter 500 is specified by this identifier (hereinafter called a "channel adapter ID").

The channel adapter 500a has fibre channel ports 402a, 402b and a processor 510a. The channel adapter 500a receives an I/O request based on the FCP protocol issued by the computers 200a and 200b through the fibre channel ports 402a and 402b.

The channel adapter 500b has IP network ports 404a, 404b and a processor 510b. The channel adapter 500b receives an I/O request based on the iSCSI protocol issued by the computers 200c and 200d through the IP network port 404a. The IP network port 404b is connected to the management computer 300. The channel adapter 500b communicates with the management computer 300 through the IP network port 404b.

The storage apparatus 400 has one or plural storage logical devices (hereinafter called logical devices) which serve as logical storage areas. The logical device corresponds to all or one portion of the storage area arranged in the hard disk drive 460. The logical device is a storage area recognized by the computer 200, and it is discriminated by a unique identifier within at least the computer system 1. The logical device is a device in which a block of 512 bytes in size is a minimum unit of data input and output (I/O). In the block, a number started from 0 is marked from the head. The block is assigned by an LBA (Logical Block Address). The blocks are assigned a number, which starts from 0, from the head, and they are specified by a LBA (Logical Block Address) respectively. The capacity of the logical device is determined by the number of blocks, and it is increased as the number of blocks is increased. With respect to the logical device of this storage apparatus 400, the computer 200 requests I/O operates based on the FCP and the iSCSI.

The disk adapter 550 controls the operations of the cache memory 450 and the hard disk drive 460 within the storage apparatus 400, and it transfers data between the cache memory 450, the hard disk drive 460 and the channel adapter 500. For example, the disk adapter 550 also improves the reliability, performance of the storage apparatus 400, etc. by controlling the operation of the hard disk drive 460 as RAID having a redundancy property. The number of hard disk drives 460 arranged in the storage apparatus 400 may be set to a plural number or one.

The data transfer between the hard disk drive 460 and the channel adapter 500 is slower than the data transfer between the cache memory 450 and the channel adapter 500. Therefore, the storage apparatus 400 also improves the data transfer performance by storing frequently accessed data in the cache memory 450.

Further, the storage apparatus 400 can limit the logical device which is able to be accessed by the computer 200. Thus, for example, it is possible to prevent the computer 200b from carelessly obtaining access to the logical device used by the computer 200a.

Figures 2, 3:
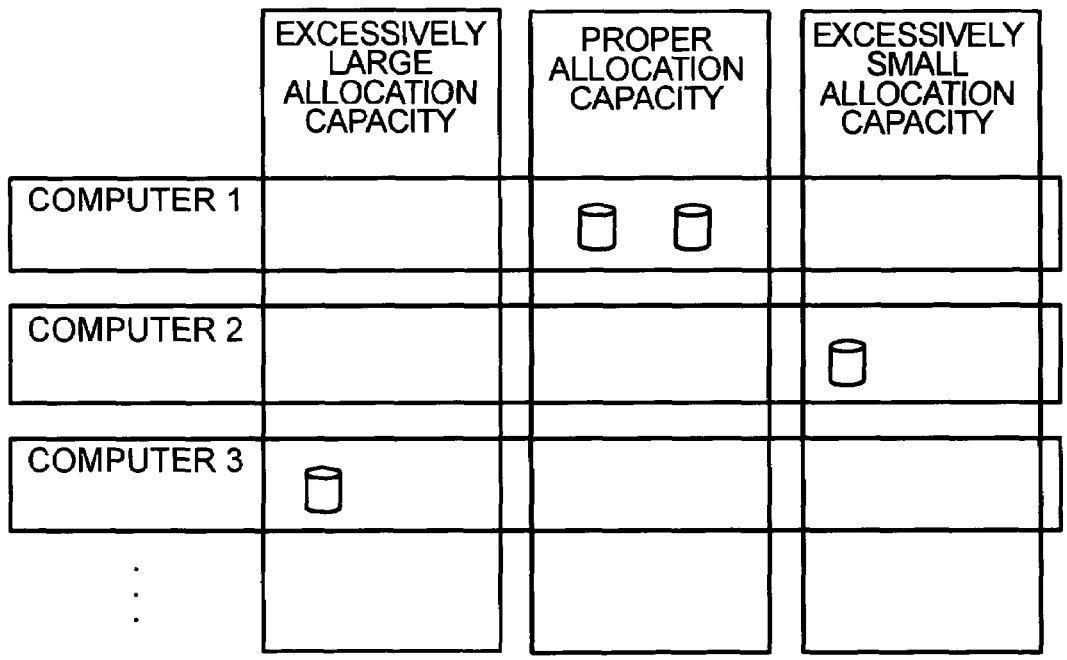
FIG. 2 is a diagram showing the contents of an access control table of this embodiment.
FIG. 3 is a diagram showing a GUI in a management computer of this embodiment.

FIG. 2 shows an access control table 700 for performing access control from a computer 200 by the storage apparatus 400. The access control table 700 is stored in the shared memory 590. A device identifier that is used to discriminate the logical device of the storage apparatus 400, a storage port identifier of the storage apparatus 400 receiving the I/O request from the computer 200, the channel adapter ID of the channel adapter 500 having a storage port, such as the fibre channel port 402a, etc., and a computer port identifier of the computer 200 that is permitted to access the storage apparatus 400 are registered to the access control table 700.

For example, if the port is the fibre channel port 402a, the storage port identifier and the computer port identifier are the port WWNs (World Wide Names) given to the ports. In contrast to this, if the port is the IP network port 404a, the storage port identifier and the computer port identifier are the IP addresses given to the ports. The channel adapter 500 executes I/O request processing to the logical device from the computer 200 with reference to this access control table 700 when the computer port identifier corresponding to the computer 200 that obtains access to the storage apparatus 400 is registered.

Similar to a normal computer, the computer 200a has a control unit, a main memory, a secondary storage, a display unit, an interface 202a for connection with the switch 50, and an interface 204a connected to the network 70. The computer 200b is also similarly constructed.

Similar to a normal computer, the computer 200c has a control unit, a main memory, a secondary storage, a display unit, an interface 202c for connection with the network 60 that is connected to the storage apparatus 400, and an interface 204c connected to the network 70 that is connected to the management computer 300. The computer 200d is also similarly constructed.

Similar to a normal computer, the management computer 300 has a control unit, a main memory, a secondary storage, a display unit and an interface 304 connected to the network 70. The management computer 300 controls the operation of the storage apparatus 400 that is connected to the network 70 through the network 70 by reading a program (management application) stored to the memory unit to the memory and executing this program using the control unit. The management computer 300 can communicate with the computer 200 and the fibre optic channel switch 50 in addition to the storage apparatus 400 through the network 70.

In the processor 510b of the channel adapter 500b communicating with the management computer 300, a program (management agent) for communicating with the management computer 300 is executed. The processor 510b receives setting and control request commands from the management application executed by the control unit of the management computer 300, and obtains, sets and changes the states of the storage apparatus 400.

The management agent is also executed in the fibre channel switch 50 and the computer 200 as well as the storage apparatus 400. In the management application operated in the management computer 300, it is also possible to communicate with these management agents and obtain, set and change the states of the fibre optic channel switch 50 and the computer 200.

FIG. 3 is a view showing a GUI (Graphical User Interface) displayed on a display screen arranged in the management computer 300 for use by a system administrator. In this figure, the logical device of the storage apparatus 400 is shown as a cylinder, and the computer 200 is shown as a rectangular shape. In this figure, when a cylinder is displayed within the rectangular shape of the computer 200, this cylinder shows that the computer 200 corresponding to this rectangular shape is set so as to obtain access to the logical device shown by this cylinder in the storage apparatus 400.

Further, in this GUI, three areas designated excessively large allocation capacity, proper allocation capacity and excessively small allocation capacity, are displayed, and the cylinder representing the logical device is displayed in one of these three areas within the rectangular shape representing the computer.

In the excessively large allocation capacity area, the logical device which is excessively large in capacity in comparison with the capacity utilization in the computer 200 is allocated. The excessively large allocation capacity shows that the area of the logical device that is unused by the computer 200 is large, and it also shows a state in which the capacity utilization is low.

In the excessively small allocation capacity area, the logical device which is excessively small in capacity in comparison with the capacity utilization in the computer 200 is allocated. The excessively small allocation capacity shows that the area of the logical device that is used by the computer 200 is large, and it also shows a state in which the allocation of a larger logical device is desirable so as not to be deficient in capacity.

In the proper allocation capacity area, the logical device which has a proper capacity in comparison with the capacity utilization in the computer 200 is allocated. The proper allocation capacity shows that the area of the logical device of the storage apparatus 400 that is unused by the computer 200 is necessary and sufficient.

The system administrator can confirm the allocating state of the logical device of the storage apparatus 400 with respect to the computer 200 by using this GUI.

FIG. 4A shows a data management table 900 which is managed by the management computer 300. The data management table 900 is stored in the memory in the management computer 300. The GUI of FIG. 3 is displayed on the display unit of the management computer 300 on the basis of this data management table 900. Information indicating a data identifier for uniquely discriminating data, the kind of application using the data, the computer using the data, a device identifier of the logical device of the storage apparatus 400, the capacity of the logical device, a lower limit securing ratio, an upper limit securing ratio, capacity collection yes/no, and the correspondence of the allocation state is registered in the data management table 900.

An entry is made in the management table 900 when a system administrator allocates a logical device of the storage apparatus 400 to a computer 200 using the management computer 300. At this time, the data identifier is created. The data identifier is a unique identifier given to data, and it is not changed even when the logical device for storing the data is changed. The identifier of the computer 200 having the logical device allocated thereto, the identifier of the allocated logical device, and the capacity of the allocated logical device are correspondingly stored.

The lower limit securing ratio and the upper limit securing ratio are set by selecting the characteristics of data to be stored to the logical device by the system administrator when the system administrator allocates the logical device to the computer. The lower limit securing ratio and the upper limit securing ratio are used when the lower limit securing capacity and the upper limit securing capacity are calculated in the course of capacity utilization monitoring processing 3000. The state of the logical device allocated to the data is determined by comparing the calculated lower limit securing capacity and the upper limit securing capacity and the capacity of the logical device.

The kind of application is set by the system administration selecting the data characteristics of the logical device when the logical device is allocated by the system administrator. The kind application is set to archive when it is judged during the capacity monitoring processing 3000 that there is no data update.

The capacity collection yes/no information is used when it is judged whether or not capacity collection processing 1000 is executed in the capacity monitoring processing 3000. The system administrator sets the value of the capacity collection yes/no information to no when it is not desirable to change the logical device for storing data by the capacity collection processing 1000 when the system administrator allocates the logical device.

The allocation state shows the state of capacity of the logical device of the storage apparatus 400 that has been allocated with respect to the data, and it is set by the capacity monitoring-processing 3000. In the capacity monitoring processing 3000, the three allocating states of "excessively large", "excessively small" and "proper" are set by comparing the lower limit securing capacity that has been calculated using the lower limit securing ratio, the upper limit securing capacity that has been calculated using the upper limit securing ratio and the capacity of the logical device. Here, the upper limit securing capacity is greater than the lower limit securing capacity.

The state of "excessively large" size is a state in which the capacity of the logical device is greater than the upper limit securing capacity. The state of "excessively large" represents a state in which a logical device of greater than required capacity is allocated to the data.

The state of "excessively small" size is a state in which the capacity of the logical device allocated to the data is smaller than the lower limit securing capacity. The state of "excessively small" represents a state in which the required capacity of the logical device is insufficient for the data.

The state of "proper" size a state in which the capacity of the logical device allocated to data is between the lower limit securing capacity and the upper limit securing capacity. The state of "proper" size represents a state in which a logical device of necessary and sufficient capacity is allocated.

The logical device that has been allocated to the data and which has an "excessively large" or "excessively small" size as an allocating state becomes an object of the capacity collection processing 1000.

The lower limit securing ratio is a ratio (data amount is set to 100) with respect to the data amount of a minimum value (lower limit securing capacity) of the capacity of the logical device to be allocated to the data. The upper limit securing ratio is a ratio (data amount is set to 100) with respect to the data amount of a maximum value (upper limit securing capacity) of the capacity of the logical device which may be allocated to the data.

When there is a sudden increase in the data amount, a large free-space capacity can be secured in the logical device with respect to the data amount by increasing the lower limit securing ratio, so that a capacity deficiency of the logical device will not occur. By increasing the upper limit securing ratio, it is possible to prevent the capacity collection processing 1000 from being executed. When there is a large change causing a reduction in the data amount, the allocating state is judged as "excessively large" due to the temporal reduction of the data amount at the time of execution of the capacity utilization monitoring processing 3000. The upper limit securing ratio is set to be larger than the lower limit securing ratio in the same entry of the data management table 900, so as to set the upper limit securing capacity that is calculated from the data amount so that it is greater than the lower limit securing capacity.

The setting of the lower limit securing ratio and the upper limit securing ratio of the management table 900 performed by the selection of data characteristics performed by a system administrator will be explained. The data characteristics selected by the system administration include the kind of application using the data, access characteristics with respect to the data, a degree of importance of the application using the data, etc. The lower limit securing ratio and the upper limit securing ratio are calculated from tables 970, 980, 990 in accordance with the selection of the system administrator.

The tables 970, 980, 990 are tables for managing an amount (addition securing ratio) of the securing ratios added to the lower limit securing ratio at the time of the selection of the data characteristics performed by the system administrator, and an amount (addition securing width) of the securing width added between the lower limit securing ratio and the upper limit securing ratio.

The lower limit securing ratio is calculated by adding the addition securing ratio corresponding to the data characteristics selected by the system administrator to 100. The upper limit securing capacity is calculated by adding the addition securing width corresponding to this lower limit securing ratio.

The table 970 is a table used for managing the addition securing ratio and the addition securing width in accordance with the kind of application. When the application is a database, the addition securing ratio is set to 10 and the addition securing width is set to 5. When the application is a file server, the addition securing ratio is set to 20, such that no capacity deficiency is caused due to data inflation. Further, since a change causing a reduction in the data amount occurs when deleting a file, the addition securing width is set to 10. When the application kind is archive, it is considered that there is no increase in data. Therefore, the addition securing ratio is set to 0 and the addition securing width is set to 2.

The application kind selected by the system administrator is set to the application kind of the management table 900.

The table 980 is a table for managing the addition securing ratio and the addition securing width in accordance with access characteristics with respect to the data. In the case of only a read operation, there is no increase in data. Therefore, the addition securing ratio is set to 0 and the addition securing width is set to 2. When the access characteristics are write once, there is only an increase in data. Therefore, the addition securing ratio is set to 10 and the addition securing width is set to 2.

The table 990 is a table for managing the addition securing ratio and the addition securing width in accordance with the degree of importance of the data. The degree of importance is such that the importance increases as the value of the importance degree is increased. When the degree of importance is 1, the addition securing ratio is set to 0 and the addition securing width is set to 2. When the degree of importance is 2, the addition securing ratio is set to 10 and the addition securing width is set to 5. When the degree of importance is 3, the addition securing ratio is set to 20 and the addition securing width is set to 10. Thus, as the degree of importance is increased, the addition securing ratio and the addition securing width are increased.

When the system administrator selects the database as the kind of the application in the selection of the data characteristics, the value 105 is obtained by adding an additional securing ratio of 5 managed in the table 970 to 100, and this value is set as the lower limit securing ratio. The value 110 is obtained by adding an addition securing width of 5 managed in the table 970 to this lower limit securing ratio, and this value is set as the upper limit securing ratio.

The system administrator may also select plural data characteristics. For example, when the database is selected as the kind of the application and write once is selected as the access characteristics and 2 is selected as the degree of data importance, the value 30, which is obtained as the sum of the addition securing ratio 10 of the database from the management table 970 of the application kind, the addition securing ratio 10 of the write once from the management table 980 of the access characteristics, and the addition securing ratio 10 of the importance degree 2 from the management table 990 of the importance degree, is added to 100. The resulting value 130 is set as the lower limit securing ratio. Similarly, the value 20, which is obtained as the sum of the addition securing width 5 of the database of the application kind, the addition securing width 10 of the write once of the access characteristics, and the addition securing width 5 of the importance degree 2, is added to the lower limit securing ratio 130. The resulting value 150 is set as the upper limit securing ratio.

When a system administrator does not select the data characteristics, the kind of the application, the lower limit securing ratio and the upper limit securing ratio in the data management table 900 are set by using "general" as the kind of the application.

FIG. 5 shows an example of the capacity utilization management table 910 managed by the management computer 300. The capacity utilization management table 910 is stored in the memory located in the management computer 300. Information indicating the correspondence of the data identifier, a time value representing a time of obtaining of the capacity utilization, the capacity utilization at the obtaining time, an obtaining period showing the time passing from the previous obtaining to the present obtaining, a maximum capacity utilization as a maximum value of the capacity utilization during the obtaining period, a minimum capacity utilization as a minimum value of the capacity utilization during the obtaining period, the number of read I/O operations during the obtaining period, and the number of write I/O operations during the obtaining period is registered to the capacity utilization management table 910.

The capacity utilization management table 910 exists for every data item distinguished by the data identifier, and it is used in the capacity utilization monitoring processing 3000 that is periodically executed by the management computer 300 when the capacity (capacity utilization of the logical device) of future data is estimated. Managing information obtained from the computer 200 is stored in the capacity utilization management table 910. When this table is filled with data, the data at the oldest obtaining time is overwritten.

FIG. 6 shows a device management table 800 that is managed by the management computer 300. The logical device of the storage apparatus 400 of the computer system 1 is centrally managed as a storage pool in this device management table 800. The device management table 800 is stored in the memory located in the management computer 300. Information indicating the correspondence of the device identifier of the logical device of the storage apparatus 400, the capacity, the cost and the computer 200 being used is registered to the device management table 800. The cost is set by the system administrator. For example, the cost of a logical device of high performance is set to be high. The computer being used is designated by the identifier of a computer using the logical device. When there is no computer using the logical device, the designation "non-existence" is set.

Figure 7A:
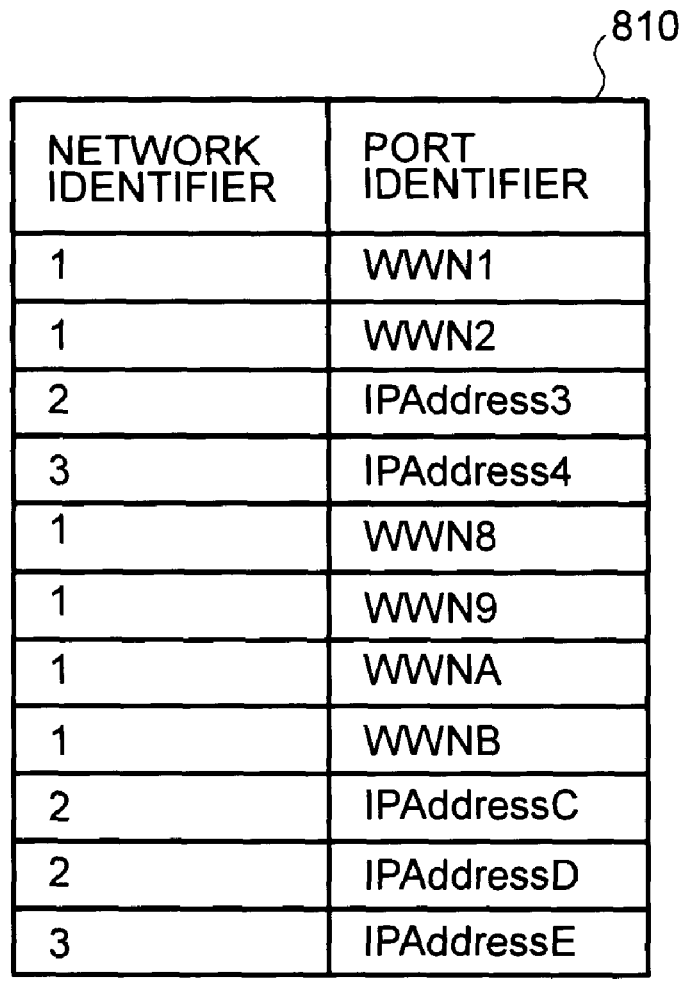
FIGS. 7A and 7B are diagrams showing the contents of a network zone member management table and a network zone management table of this embodiment.
Figure 7B:
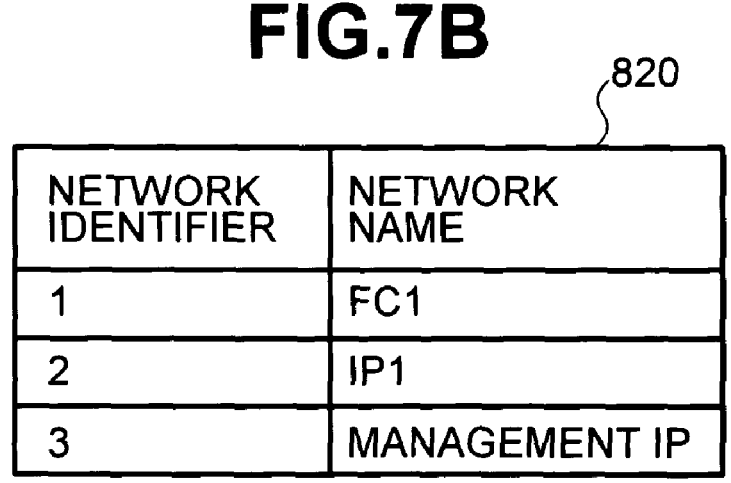

FIGS. 7A and 7B are diagrams showing a network zone member management table 810 and a network zone management table 820, respectively. Information, which indicates to which network a port, such as a fibre channel port arranged in the storage apparatus 400 and the computer 200, etc., belongs, is registered in the network zone member management table 810. Here, the port to which the same network identifier is allocated indicates that the port belongs to the same network. Communication can be mutually effected only between ports belonging to the same network. This network zone member management table 810 is managed by the management computer 300, and it is used when it is judged whether communication can be made between two ports in the capacity collection processing 1000 executed from the capacity utilization monitoring processing 3000 that is periodically executed by the management computer 300.

Information indicating the correspondence of the network identifier and a network name is registered to the network zone management table 820. For example, the network name corresponding to a network identifier 1 is "FC1".

Figure 8A:
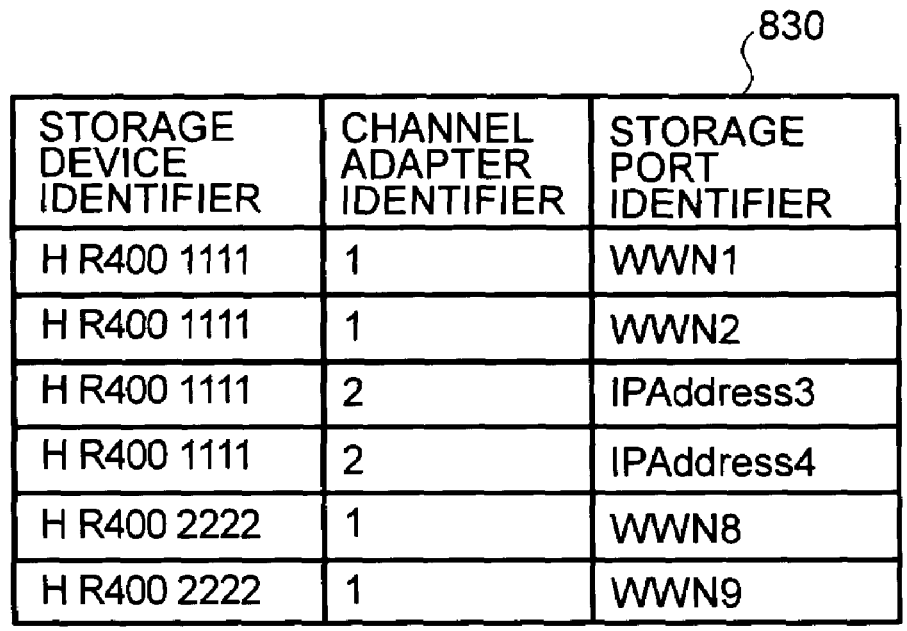
FIGS. 8A and 8B are diagrams showing the contents of a storage port management table and a computer port management table of this embodiment.
Figure 8B:
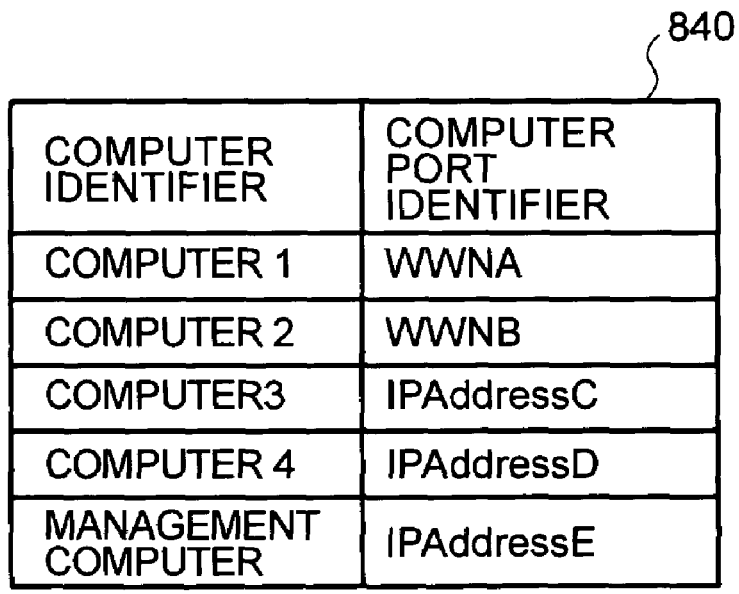

FIGS. 8A and 8B are diagrams showing a storage port management table 830 and a computer port management table 840, respectively. The identifier corresponding to the storage apparatus 400, the channel adapter number corresponding to the channel adapter 500 arranged in the storage apparatus 400, and the storage port identifier are registered in the storage port management table 830. The storage port management table 830 is managed by the management computer 300, and it is used when the channel adapter 500 having the port and the storage apparatus 400 are retrieved from the storage port identifier in the capacity collection processing 1000 executed from the capacity utilization monitoring processing 3000 that is periodically executed by the management computer 300.

In contrast to this, a computer identifier indicating the computer 200 and a computer port identifier are registered in the computer port management table 840. The computer port management table 840 is managed by the management computer 300, and it is used when the identifier corresponding to the port arranged in the computer 200 is obtained in the capacity collection processing 1000 executed from the capacity utilization monitoring processing 3000 that is periodically executed by the management computer 300.

In accordance with the present invention, the data amount (capacity utilization) of the logical device is periodically obtained. The lower limit securing capacity and the upper limit securing capacity that have been calculated from the lower limit securing ratio and the upper limit securing ratio set in the data and the capacity of the logical device allocated in the data are compared. The logical device is changed when the capacity of the logical device does not lie between the lower limit securing capacity and the upper limit securing capacity. In this embodiment, the capacity utilization monitoring processing is executed every three weeks.

Figure 9:
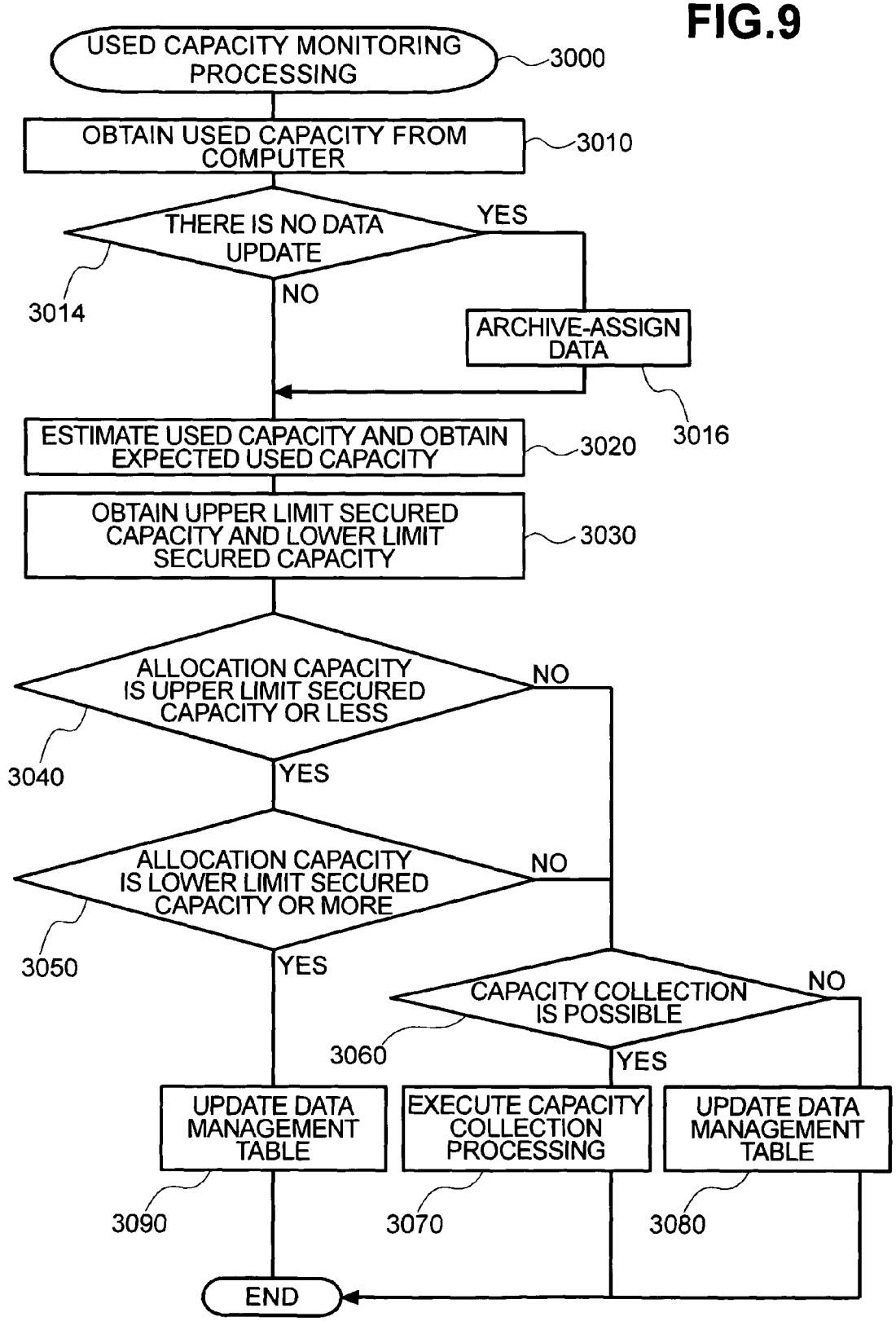
FIG. 9 is a flow chart showing the procedure of capacity utilization monitoring processing of this embodiment.

FIG. 9 is a flowchart showing the flow of the capacity utilization monitoring processing 3000 that is periodically executed by the management computer 300. By performing this processing, it is determined whether the capacity allocated in the computer is appropriate or not. When this capacity is not appropriate, the logical device of the storage apparatus 400 is reallocated by the capacity collection processing 1000, which will be described later with reference to FIG. 10. Thus, the capacity allocation of the computer system 1 is optimized.

The function of the capacity utilization monitoring processing 3000 is realized by executing a managing program that has been loaded in the memory within the management computer 300 by the control unit. The managing program may also be introduced through a memory medium (CD-ROM, DVD-ROM, server, etc.) readable by the management computer 300 or a communication medium, such as a network or a carrier wave propagated on the network, which can be utilized by the management computer 300 at a necessary time. Further, one portion or all portions of the function of the capacity utilization monitoring processing 3000 may also be realized by hardware (LSI, etc.).

The management computer 300 obtains capacity utilization (data capacity), maximum capacity utilization (maximum data capacity), minimum capacity utilization (minimum data capacity), the number of read I/O operations and the number of write I/O operations as information relating to the monitoring of object data managed by the data identifier in the data management table 900 from the computer 200 using the monitoring object data through the network 70. The management computer 300 then stores such information in the capacity utilization management table 910 together with an obtained time and a passing time (obtained period) from the previous obtaining time (step 3010).

When the capacity utilization, the maximum capacity utilization and the minimum capacity utilization from the past to the present time, are the same values and the number of write I/O operations is 0 with reference to the capacity utilization, the maximum capacity utilization, the minimum capacity utilization and the number of write I/O operations of the capacity utilization management table 910 with respect to the monitoring object data (step 3014) (when there is not data update), the application kind field of the data management table 900 corresponding to the monitoring object data is set to "archive", and the lower limit securing ratio is set to 100 and the upper securing ratio is set to 105 (step 3016).

When there is no case in which there is no data update in the step 3014, the management computer 300 estimates the future capacity utilization from the present capacity utilization and the past capacity utilization (step 3020).

In this embodiment, the expected capacity utilization is obtained by linearly extrapolating the capacity utilization at the next executing time point of the capacity utilization monitoring processing 3000 from the newest capacity utilization obtained in the step 3010 and the capacity utilization previously obtained.

In other embodiment, the accuracy of the estimation can be improved by estimating the capacity utilization by using more past data. When the expected capacity utilization calculated by using past data is smaller than the maximum value of the maximum capacity utilization of the capacity utilization management table 910, the expected capacity utilization also can be set to the maximum value of this maximum capacity utilization.

Further, when the capacity utilization is greatly increased and decreased and no accuracy of the estimation can be anticipated, the newest capacity utilization also may be set to the estimated capacity utilization. The logical device may be set so as not to be changed by changing the capacity collection yes/no entry of the data management table 900 to no.

Next, the management computer 300 obtains the lower limit securing ratio and the upper limit securing ratio corresponding to the monitoring object data from the data management table 900, and it multiplies the expected capacity utilization calculated in the step 3020 by the lower limit securing ratio and the upper limit securing ratio, so that the management computer 300 obtains the lower limit securing capacity and the upper limit securing capacity (step 3030).

The capacity of the logical device allocated to the monitoring object data and the upper limit securing capacity obtained in the step 3030 are then compared with each other (step 3040). When the capacity of the logical device is equal to the upper limit securing capacity or less, the capacity of the logical device is compared with the lower limit securing capacity (step 3050). When the capacity of the logical device is equal to the lower limit securing capacity or more, the corresponding allocating state of the data management table 900 is set to "proper" (step 3090).

In contrast to this, when the capacity of the logical device is greater than the upper limit securing capacity in the step 3040, or when the capacity of the logical device is smaller than the lower limit securing capacity in the step 3050, the corresponding value of the capacity collection yes/no field of the data management table 900 is referred to (step 3060). If the capacity collection is possible, the capacity collection processing 1000 is executed (step 3070).

In contrast to this, when the capacity collection is impossible in the step 3060, the corresponding allocating state of the data management table 900 is changed to "excessively large" if the capacity of the logical device is greater than the upper limit securing capacity, and it is changed to "excessively small" if the capacity of the logical device is smaller than the lower limit securing capacity (step 3080). The processing is then terminated.

Figure 10:
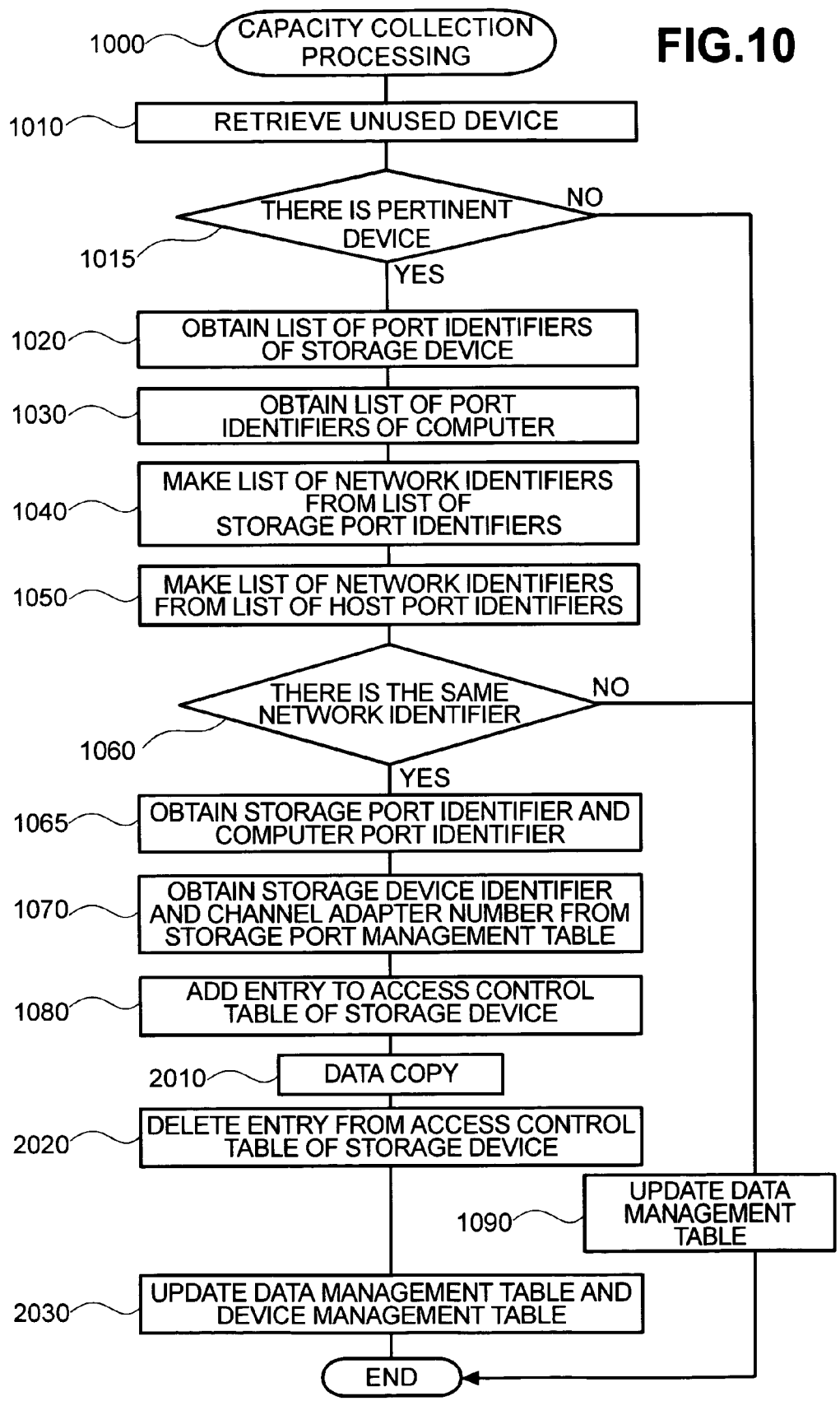
FIG. 10 is a flow chart showing the procedure of capacity collection processing of this embodiment.

FIG. 10 is a flowchart showing the flow of the capacity collection processing 1000 executed when it is judged in the capacity utilization monitoring processing 3000 that the capacity allocation of the logical device to the monitoring object data is inappropriate. The logical device of the storage apparatus 400 of appropriate capacity is allocated to the computer 200 and the original logical device is collected in a storage pool by performing this processing. The function of the capacity collection processing 1000 is realized by the control unit executing the managing program loaded in the memory within the management computer 300. The managing program also may be introduced through a memory medium (CD-ROM, DVD-ROM, server, etc.) readable by the management computer 300 or a communication medium, such as a network or a carrier wave propagated on the network, which can be utilized by the management computer 300 at a necessary time. Further, one portion or all portions of the function of the capacity collection processing 1000 also may be realized by hardware (LSI, etc.).

The management computer 300 retrieves a logical device of the upper limit securing capacity or less and the lower limit securing capacity or more that is unallocated to the computer from the device management table 800, and it obtains the device identifier thereof (step 1010). When the application kind field of the monitoring object data indicates "archive", the condition that the cost is low is added to the retrieving condition. In another embodiment, a logical device of an intermediate value of the upper limit securing capacity and the lower limit securing capacity also can be obtained from an unused area of the storage apparatus 400. Such a technique is described, e.g., in JP-A-2002-222061.

As a result of such retrieval, when there is a pertinent device, the management computer 300 obtains a list of storage port identifiers corresponding to the identifier of the logical device obtained in the step 1010 from the storage port management table 830 (step 1020).

Further, the management computer 300 obtains the computer 200 corresponding to data in which it is judged that the capacity allocation is not appropriate from the data management table 900. The management computer 300 also obtains a list of computer port identifiers corresponding to the computer 200 from the computer port management table 840 (step 1030).

Further, the management computer 300 makes a list of network identifiers corresponding to the storage port identifier obtained in the step 1020 by using the network zone member management table 810. At this time, when there are overlapped network identifiers, the management computer 300 excludes the overlapped network identifiers from the list and sets the overlapped network identifiers to one network identifier (step 1040).

Thereafter, the management computer 300 makes a list of network identifiers corresponding to the computer port identifier obtained in the step 1030 by using the network zone member management table 810 (step 1050).

Thereafter, the management computer 300 compares the list of the network identifiers made in the step 1040 and the list of the network identifiers made in the step 1050 (step 1060).

When the same network identifiers are provided in both lists, the management computer 300 obtains the storage port identifier corresponding to the network identifier confirmed in the step 1060 from the list of the storage port identifiers obtained in the step 1020, and it also obtains the computer port identifier corresponding to the network identifier confirmed in the step 1060 from the list of the computer port identifiers obtained in the step 1030 (step 1065).

The management computer 300 further obtains a storage device identifier and a channel adapter number from the storage port management table 830 by using the storage port identifier obtained in the step 1065 (step 1070). Further, the management computer 300 adds the storage port identifier and the computer port identifier obtained in the step 1065 and the channel adapter number obtained in the step 1070 to the storage access control table 700 of the storage apparatus 400 corresponding to the storage device identifier obtained in the step 1070. More specifically, when an entry is added to the storage access control table 700, the management computer 300 gives commands of the addition to the storage apparatus (step 1080).

Next, the management computer 300 copies data, which was stored to the logical device (old device) which has been judged as having an inappropriate capacity allocation with respect to the computer 200, to a logical device (new device) retrieved in the step 1015 and set so as to be accessed from the computer 200 in the step 1080 (step 2010).

The copying of this data can be executed by a copy command in the computer 200. Since the copy operation in the computer 200 is made by copying files, a long time is required to complete the copy operation so that the load of the computer 200 is raised. When the load of the computer 200 can not be raised, the data also can be copied from the old device to the new device by copying the file in the management computer 300. It is necessary to inhibit writing to the old device in order to completely copy the data from the old device to the new device. Therefore, it is necessary to execute the copying operation at a time (e.g., nighttime) at which the operations are stopped and no writing to the old device is initiated.

When a read or write of the data stored to the old device can not be stopped for a long time, or when a load can not be applied to the computer 200 and the management computer 300, the data copy operation can be effected by using a function for performing the data copy operation between the logical devices in the storage apparatus 400. Such a storage apparatus 400 is disclosed in U.S. Pat. No. 5,051,887. When the capacity of the old device is greater than that of the new device and the number of data blocks of the old device is greater than that of the new device, data stored to blocks of the old device of LBAs greater than a maximum LBA of the new device can not be copied to the new device. These blocks are set to unused states, and a partition of the old device is reduced to a partition having the same block number as that of the new device without losing the data. Thereafter, the data is copied from the old device to the new device by utilizing the data copy function of the storage apparatus 400. The method of reducing the partition is disclosed in U.S. Pat. No. 5,675,769. After the copy operation is terminated, the management computer 300 deletes the entry from the storage access control table 700 of the storage apparatus 400 corresponding to the logical device in which is judged that the capacity allocation is inappropriate (step 2020).

Further, the management computer 300 updates the device identifier and the capacity corresponding to the data of the data management table 900, and it sets the allocating state to "proper". Further, the management computer 300 sets the computer of the logical device, which was judged as having an inappropriate capacity allocation in the device management table 800 to non-existence, and it updates the computer of a newly allocated logical device to the computer obtained in the step 1030, and the processing, is then terminated.

When no pertinent device is found in the step 1015, or when no conforming network identifier is found in the step 1060, the allocating state of the data management table 900 is changed to "excessively large" when the capacity of the logical device is greater than the upper limit securing capacity in a step 3040, and it is changed to "excessively small" when the capacity of the logical device is smaller than the lower limit securing capacity in a step 3050 (step 1090). The processing is then terminated.

In accordance with the present invention, the capacity of the logical ,device of the storage apparatus 400 allocated to data is monitored by the management computer 300, and the logical device is changed when the allocating capacity is excessively large or excessively small. Therefore, the allocating state of the logical device of the storage apparatus 400 in the computer system 1 is automatically optimized, and the capacity can be efficiently used.

In accordance with the present invention, it is possible to provide a managing method and a managing program for efficiently using resources by collecting an excessively allocated storage area in a storage pool so as to utilize this storage area in another computer.

What is claimed is:

1. A managing method to be executed by a management computer connected to a computer and to a storage apparatus through a network, said storage apparatus having plural logical devices, the managing method comprising the steps of:

setting a lower limit securing ratio and an upper limit securing ratio in a data management table, based on characteristics of data to be stored in a logical device of said storage apparatus;

allocating a first logical device of predetermined capacity from a storage pool of unallocated logical devices of the storage apparatus to said computer, said capacity being greater than or equal to said lower limit securing capacity and less than or equal to said upper limit securing capacity;

monitoring and periodically obtaining a current capacity utilization of said first logical device allocated to said computer;

estimating a future capacity utilization of said first logical device, said estimated future capacity utilization being calculated from the capacity utilizations periodically obtained for said first logical device;

multiplying the estimated future capacity utilization by the lower limit securing ratio and by the upper limit securing ratio to obtain a lower limit securing capacity and an upper limit securing capacity, respectively;

if the capacity of the allocated first logical device is less than or equal to the upper limit securing capacity, and if the capacity of the allocated first logical device is greater than or equal to the lower limit securing capacity, retaining the allocation of the first logical device to the computer;

if the capacity of the allocated first logical device is greater than the upper limit securing capacity or less than the lower limit securing capacity, determining whether a change in logical device allocated to the computer can be made;

if it is determined that the change in logical device allocated to the computer can be made, allocating a second logical device of predetermined capacity from the storage pool to said computer, releasing the allocation of the first logical device to said computer, and returning the first logical device to the storage pool; and if it is determined that the change in logical device allocated to the computer cannot be made, setting in the data management table an indication that the capacity of the allocated first logical device is excessively large if the capacity is greater than the upper limit securing capacity, or an indication that the capacity of the allocated first logical device is excessively small if the capacity is less than the lower limit securing capacity.

2. The managing method according to claim 1, wherein said estimating step is performed by linearly extrapolating the capacity utilization to a future time point from at least two time points of monitoring and obtaining a current capacity utilization.

3. The managing method according to claim 1, wherein if the estimated future capacity utilization is less than a maximum capacity utilization previously obtained for said first logical device by said monitoring and periodically obtaining step, the estimated future capacity utilization is set to a maximum capacity utilization previously obtained.

4. The managing method according to claim 1, further comprising the step of setting the estimated future capacity utilization to the most recently-obtained current capacity utilization.

5. The managing method according to claim 1, wherein if the capacity of said allocated first logical device is greater than the estimated future capacity utilization by a determined amount, the managing method further comprises the step of copying data stored in said first logical device to said second logical device, wherein said copying step is completed before performing said step of releasing the allocation of said first logical device to the computer.

6. The managing method according to claim 1, further comprising the step of reducing the size of a file system made in the first logical device before the data copying is executed.

7. The managing method according to claim 1, wherein said step of calculating said estimated future capacity utilization calculates the estimated future capacity utilization on the basis of the kind of application for utilizing each logical device, access characteristics or the degree of importance of stored data in addition to the capacity utilization of said each logical device.

* * * * *